March 22, 1927.
C. H. TAYLOR ET AL
AEROPLANE
Filed Oct. 15, 1921
1,622,242
7 Sheets-Sheet 2
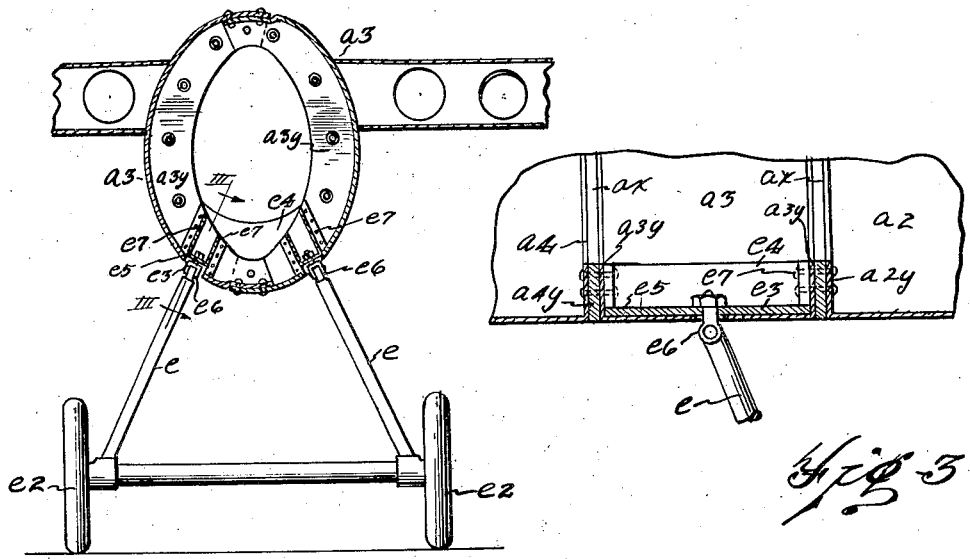
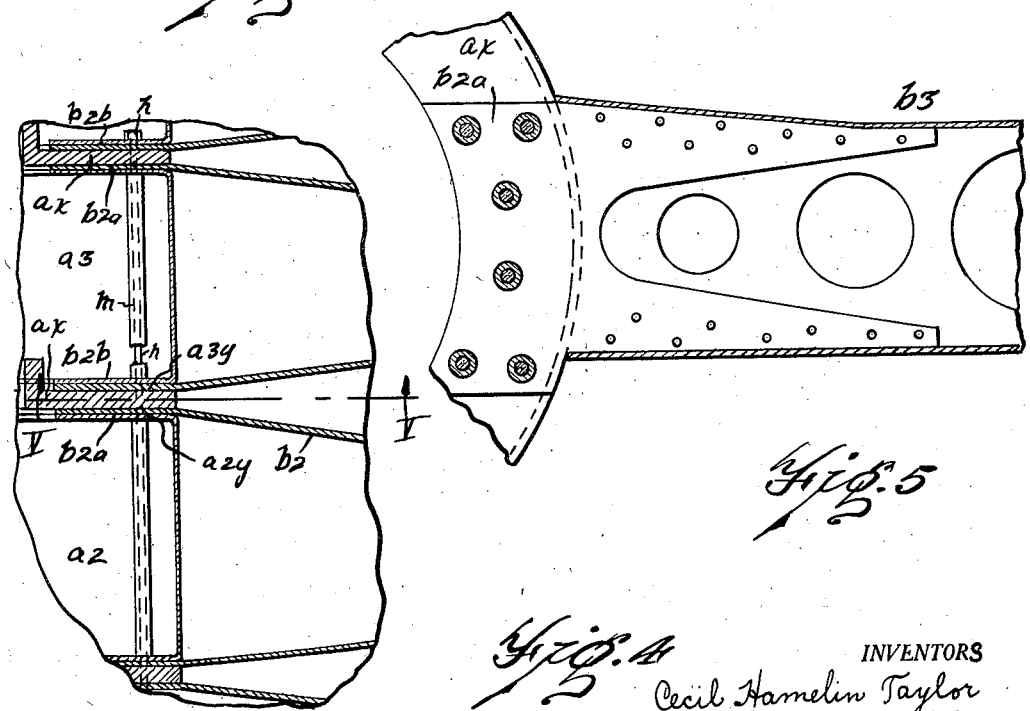
INVENTORS
Cecil Hamelin Taylor
Boudewijn B. Neuteboom
By Ralzemond A. Parker ATTORNEY.

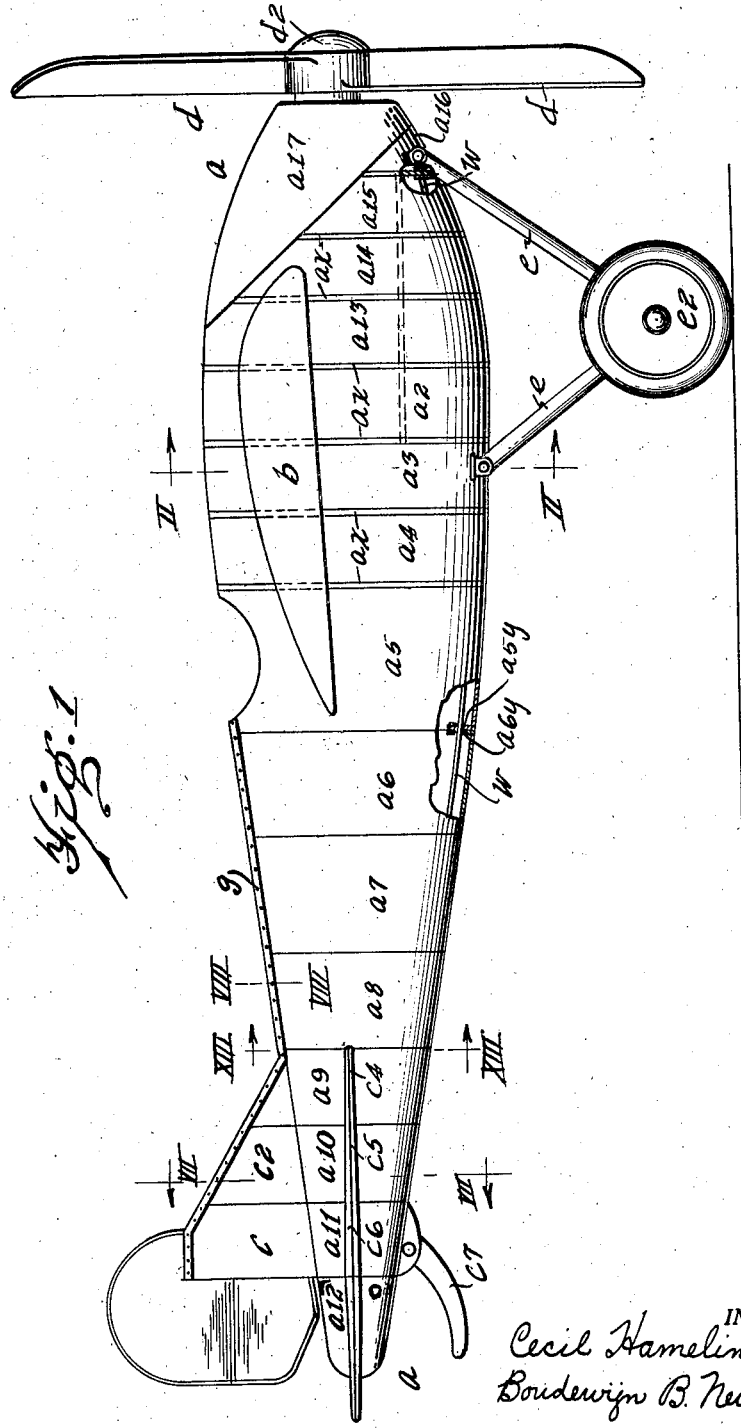

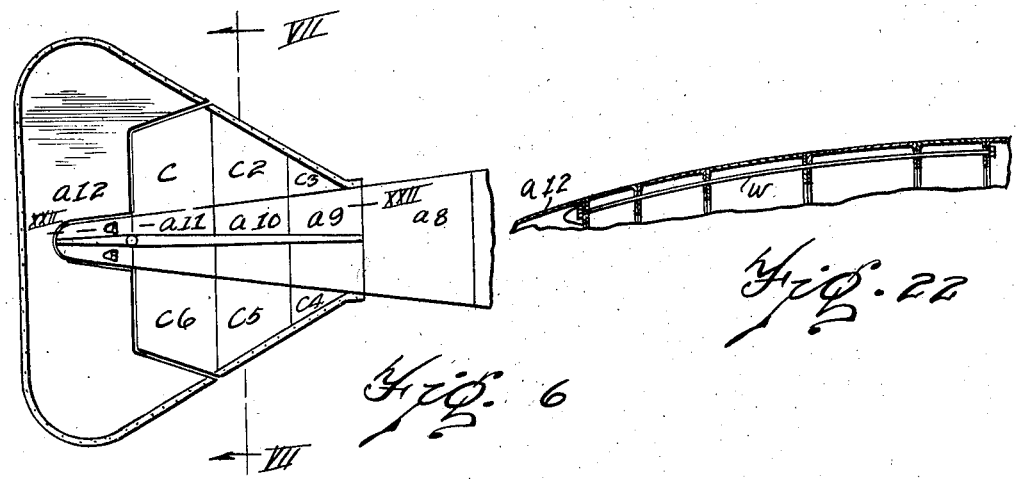
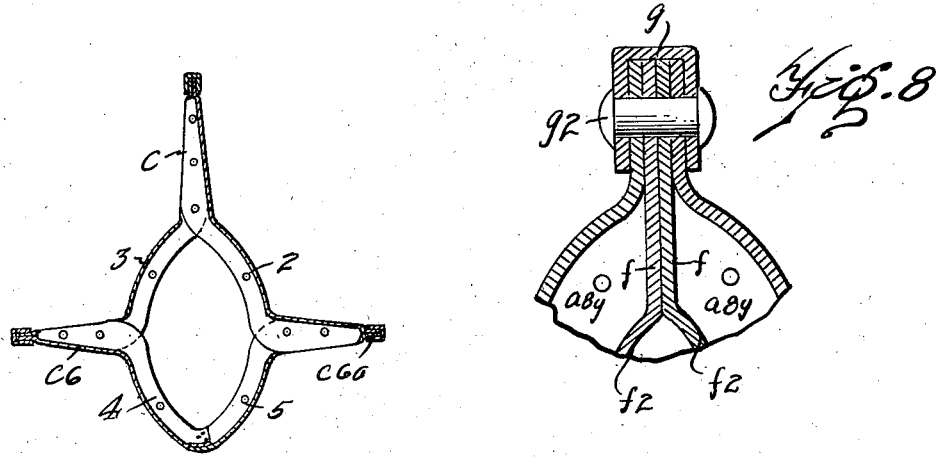

March 22, 1927. 1,622,242
C. H. TAYLOR ET AL
AEROPLANE
Filed Oct. 15, 1921 7 Sheets-Sheet 4

INVENTORS
Cecil Hamelin Taylor
Bouldewijn B. Neuteboom
By Ralzemond A. Parker ATTORNEY.

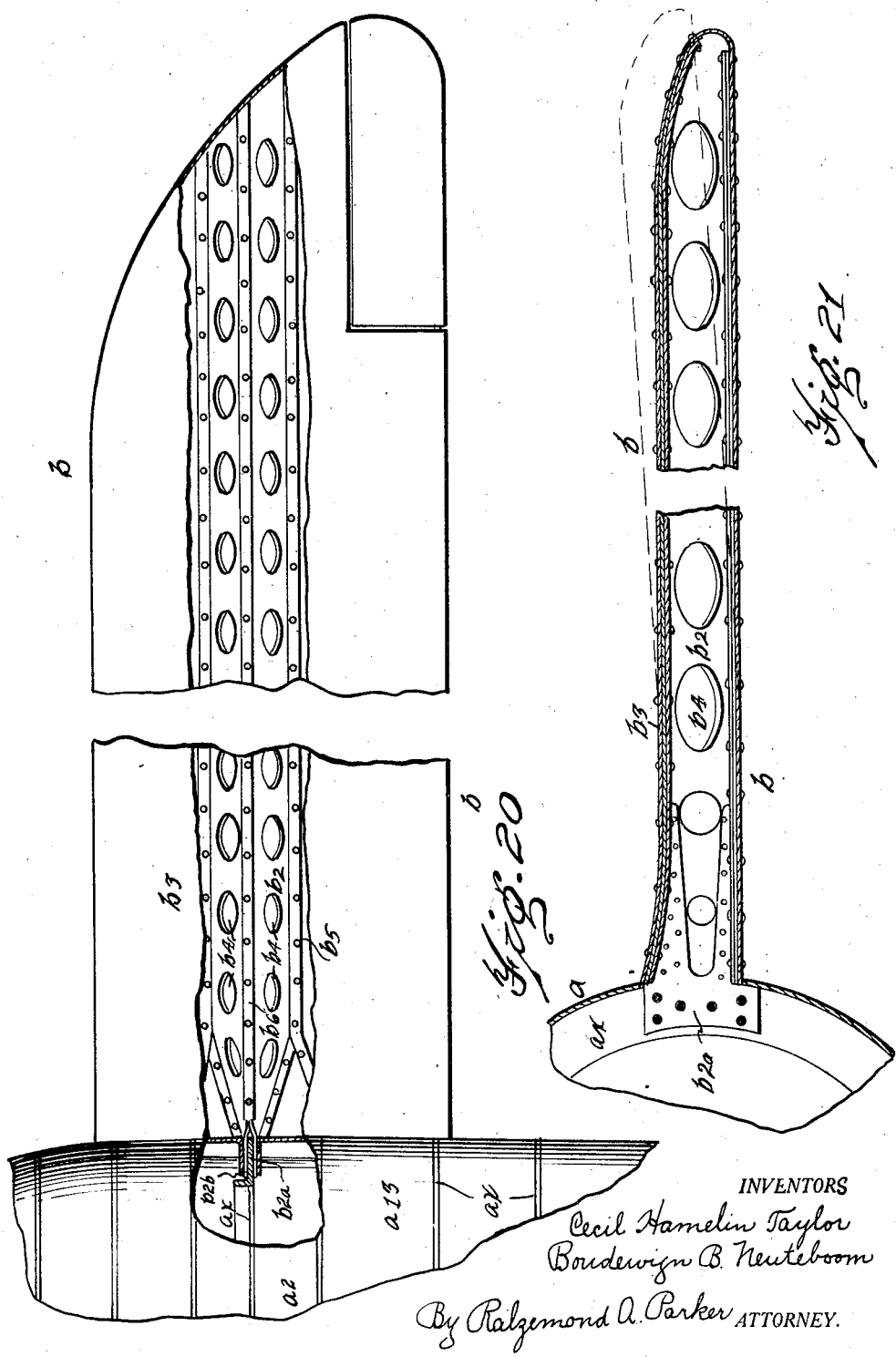

Patented Mar. 22, 1927.

1,622,242

UNITED STATES PATENT OFFICE.

CECIL HAMELIN TAYLOR AND BOUDEWIJN B. NEUTEBOOM, OF DETROIT, MICHIGAN.

AEROPLANE.

Application filed October 15, 1921. Serial No. 507,848.

Our invention relates to aeroplanes and a special object of our improvements is to provide a light, strong, metal construction that will be easily assembled.

In the accompanying drawings,

Figure 1 is a side elevation of an aeroplane embodying our invention.

Fig. 2 is a section on the line II—II Fig. 1.

Fig. 3 is a detailed sectional view on the line III—III Fig. 2.

Fig. 4 is a detailed sectional view illustrating the mode of attaching the wings to the body.

Fig. 5 is a detailed sectional view in the plane V—V Fig. 4.

Fig. 6 is a plan view of the rear portion of the aeroplane.

Fig. 7 is a detailed section on the line VII—VII Fig. 6.

Fig. 8 is a detailed section on the line VIII—VIII Fig. 1.

Fig. 9 is a view similar to Fig. 8 showing a modified construction.

Fig. 20 is a plan view of the wing and adjacent portion of the body, the deck being partly broken away to exhibit the interior construction.

Fig. 21 is a view similar to Fig. 20, the section being taken at right angles to that of Fig. 20.

Fig. 22 is a detailed section on the line XXII—XXII Fig. 6.

Figure 16:
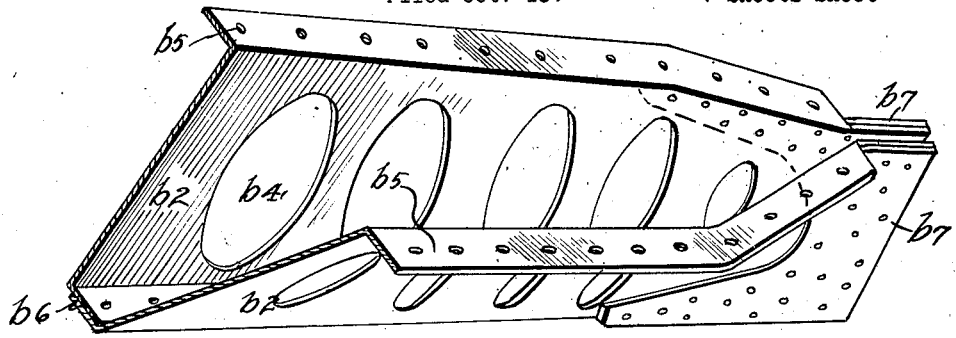
Fig. 16 is a perspective view of an end portion of one of the ribs of the wing illustrating the mode of securing the wing to the body.

$a$ is the body or fuselage of the plane. This is made up of annular or elliptical sections indicated in Fig. 1 by the reference characters $a^2$ to $a^{11}$. At the rear of the plane is a cap or finishing piece $a^{12}$ and at the front of the body of the plane are part sections $a^{13}$, $a^{14}$, $a^{15}$ and $a^{16}$ which are chamfered off as indicated to leave an opening for the admission and withdrawal of the engine. This opening is covered by a suitably formed cap $a^{17}$.

Figure 10:
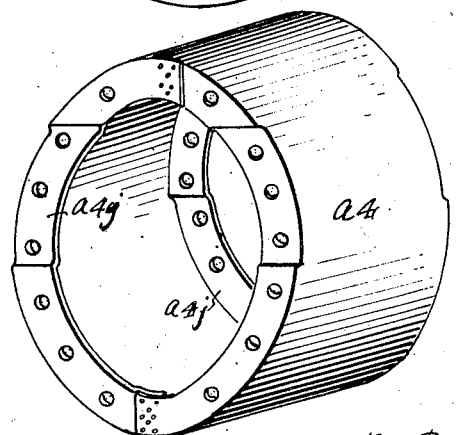
Fig. 10 is a perspective view of one of the sections of which the body of the plane is composed.

The sections of which the body is composed are of thin sheet aluminum and are formed into the approximate shape of cylinders with their end edges turned inward to form flanges as $a^4y$, $a^4$ in Fig. 10. These sections are placed together end for end with the flanges corresponding to $a^4y$ contiguous in the main portion of the body and adjacent in all portions. At the portion of the body adjacent to the wings a rod $n$ is passed through the registering apertures in said flanges and spacing tubes $m$ are placed over said rods as indicated in Fig. 4. The flanges are then bound together by nuts on the ends of the rods being screwed up or otherwise. There are a series of wires $w$ that pass thru apertures in the flanges of the sections secured at the rear of the cap piece $a^{12}$ and at the forward end to the foremost available part of the aeroplane and tensioned by securing means to hold the various sections together.

Figure 11:
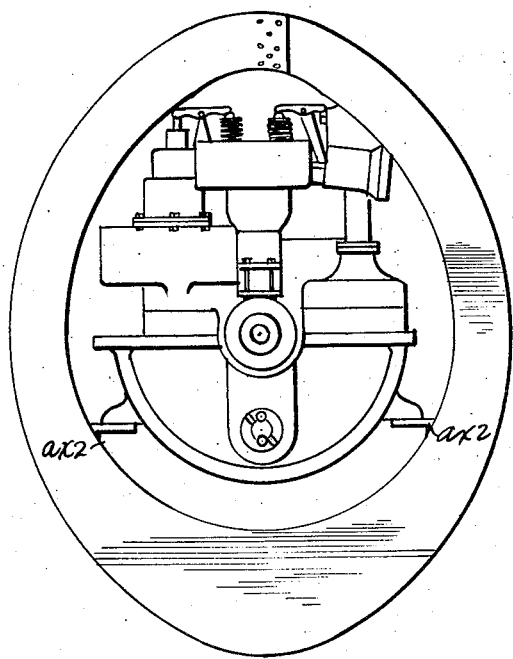
Fig. 11 is a front view of the aeroplane, the propeller and the cover $a^{17}$ being removed to show the inner construction.
Figure 12:
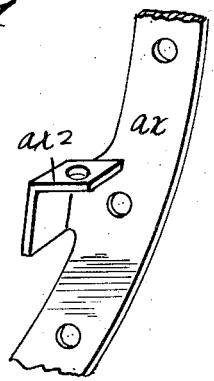
Fig. 12 is a detailed perspective view showing the construction for supporting the engine.

At the forward portion of the body where the strain of landing, and supporting during flight, must be sustained by the body, strengthening flat annular or elliptical rings $a\ x$ are placed between the flanges of adjacent sections as indicated distinctly in Fig. 4. The flanges of the sections are then bound tightly to these strengthening ribs or rings. The rings $a\ x$, toward the front of the body and where the engine is located, are provided with lugs $ax^2$ (Figs. 11 and 12) to serve as means for securing the engine to the body of the plane.

Figure 15:
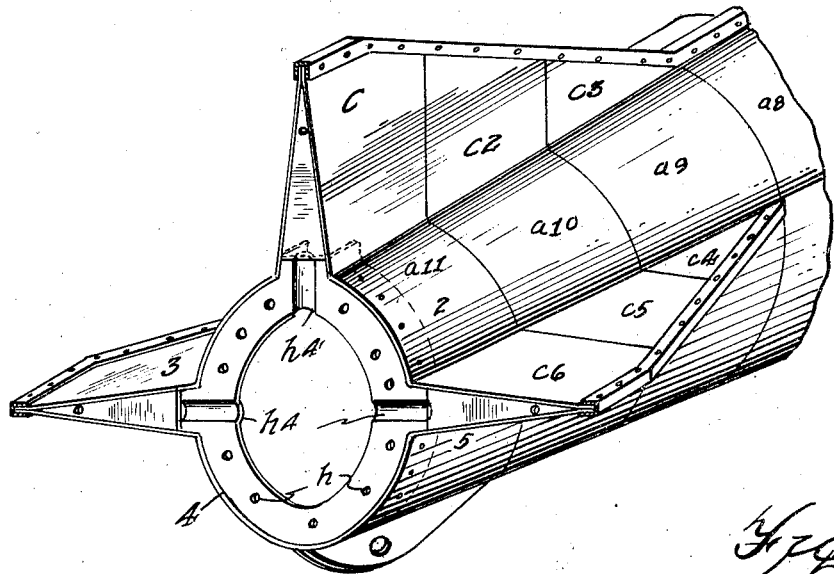
Fig. 15 is a perspective view of the rear end of the body of the aeroplane, the finishing cap $a^{12}$ being removed and also the rudders.
Figure 13:
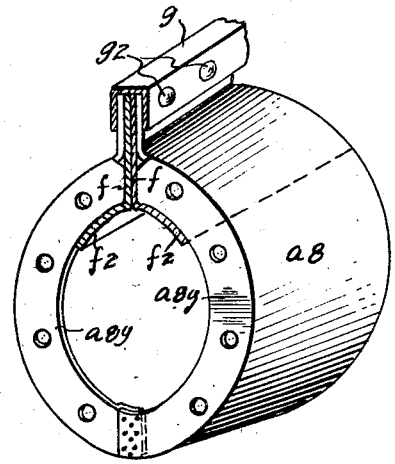
Fig. 13 is a perspective view partly in section of the portion of the aeroplane to the sectional plane XIII—XIII Fig. 1.

Toward the rear end of the body it is desirable to provide fins $c$, $c^6$ and 3 (Fig. 15), therefore, the annular section construction is replaced in this locality by a construction that substitutes quadrants or plates formed like the sections of the body but extending only a quarter way around the circle, their ends being turned outward to contribute to the forming of the fins. This construction is well illustrated in Figs. 6, 7 and 15. The flanges of these quadrant plates at their ends are bound together and at their outer edges at the ridge of the fins are secured together by the construction shown in Figs 8, 9 and 13, this joint construction also extending to the cockpit of the body. This joint construction is described as follows:

Two plates $ff$ having their lower edges bent outward at $f^2$ are interposed between adjacent edges of the ring or quarter ring, as the case may be, their bent portions $f^2$ extending and engaging under the flanges $ay$ at the edges of the section or quarter section. The edges of said section or quarter section to be bound together form flanges engaging on opposite sides of the plates $ff$ as shown distinctly in Figs. 8 and 9. A binding piece $g$, having the cross section of an inverted U, is then placed over the upper edges of the plates $ff$ and the contiguous flanges of the parts of the body section and the whole is bound together by a bolt $g^2$ passing through apertures in said flanges as shown in Fig. 8 or by indenting the side flanges of the inverted U piece $g$ as shown in Fig. 9.

Figure 14:
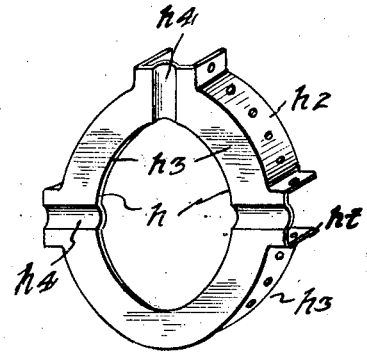
Fig. 14 is a perspective view of the filling piece at the rear end of the body of the aeroplane.

$h$ (Fig. 14) is a ring adapted to fit in the rear end of the body of the plane to form a finishing piece. This ring is provided with half bearings $h^4$ extending radially to receive the shafts of the rudders or aerofoils. A cap $a^{12}$ is then placed over the rear end of the body having bearing portions corresponding to $h^4$ and secured in place, thus forming the finishing of the rear end of the body of the plane.

Figure 17:
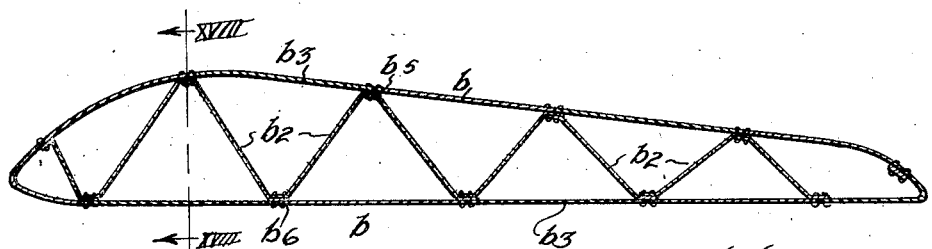
Fig. 17 is a cross section of the wing.
Figure 18:
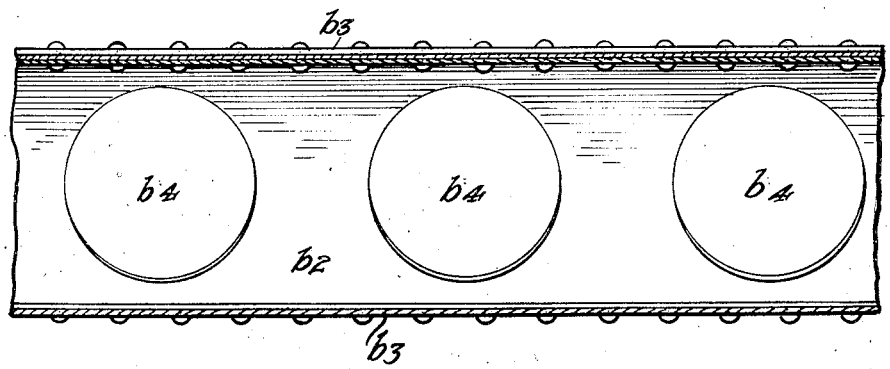
Fig. 18 is a detailed sectional view of a portion of the wing shown in Fig. 17 in a plane at right angles to that of said figure.
Figure 19:
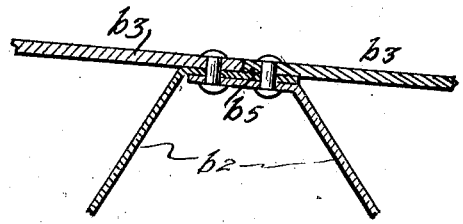
Fig. 19 is a detailed sectional view illustrating the mode of attaching the ribs to the deck of the wing.

$b$ indicates the wing of the plane. This is formed with a cover part $b^3$ and a spacing means serving both for bracing and to constitute a girder-like construction to prevent the bending of the plane longitudinally as indicated by the broken line in Fig. 21. This spacing means consists of thin sheet metal secured to the upper and lower decks of the plane as indicated at $b^5$ and $b^6$ in Fig. 17 and extending slantingly from one plane to the other, the various parts forming a substantially continuous corrugated surface transversely of the plane the plane surfaces each substantially in a single plane extending longitudinally of the wing. Adjacent portions of these spacing and strengthening means $b^2$ of the wing are bent or warped inward at their ends as illustrated in Fig. 16 to form attaching flanges $b^7$ $b^7$ which engage on opposite sides of rings $ax$ and are bolted thereto. These flanges should be strengthened by fish-plates as shown. The middle of the spacing and strengthening means $b^2$ is cut away as indicated at $b^4$ to lighten the construction while retaining the strengthening function of the part $b^2$.

$e^2$ $e^2$ are landing wheels connected to the body by the struts or frame members $e$ $e$. $e^3$ (Fig. 3), is a strengthening frame placed between the flanges $a^3y$ of the section $a^8$ and secured by bolts passing through such flanges and also through the rings $ax$. This frame consists of side pieces $e^4$ $e^4$ and a bottom plate $e^5$. The side pieces $e^4$ are turned outward at their ends to form securing flanges $e^7$ $e^7$ (Fig. 2) through which the rivets or bolts passing through the rings $ax$ and the flanges $a^2y$, $a^3y$ and $a^4y$ pass. The outer wall of the body is cut away to permit a securing bolt $e^6$ to pass therethrough which serves to connect one of the braces or frame pieces $e$ with the bottom of the strengthening frame $e^3$.

What we claim is:

1. An air craft body composed of annular sections of thin metal, said sections having their edges turned inward, said sections being secured together axially in line with each other, a strengthening ring interposed between adjacent edges of said sections and stress transmitting parts secured to said rings.

2. An aircraft body composed of annular sections secured together axially in line with each other, said sections being turned at right angles at their edges to form securing flanges, one rod or more extending through said flanges and means whereby said rod is caused to bind said sections together.

3. An aircraft body composed of annular sections of thin metal, said sections having their edges turned inward, said sections being secured together axially in line with each other by binding the in-turned edges of adjacent sections together, and strengthening rings bound between said flanges where especially violent strains occur.

4. In an aeroplane body, the combination of annular sections placed axially in line and strengthening rings interposed between said sections, said sections being turned inward at their edges to form flanges in planes at right angles to their surfaces, said rings being interposed between adjacent flanges of said sections where especially violent strains occur and means for binding said flanges and ring together.

5. In an aeroplane body, the combination of annular sections placed axially in line and strengthening rings interposed between said sections, and a wing construction secured to said rings.

6. In an aeroplane body, the combination of annular sections placed axially in line and strengthening rings interposed between said sections, and landing gear secured to said rings.

7. In an aeroplane body, the combination of annular sections placed axially in line and strengthening rings interposed between said sections, a strengthening frame extending between adjacent pairs of said rings and a landing gear secured to said strengthening frame.

8. In an aeroplane body the combination of annular sections placed axially in line with each other, and strengthening rings interposed between said sections, and an engine secured to said rings.

9. The body construction for aircraft provided with fins, plates adapted to form the wall of said body, and bending outward to form said fins, each of said plates forming a quarter of the periphery of the surface of the body, said plates being turned at their edges into a plane at right angles to the surface to form securing flanges.

10. In an aircraft, a body wall of sheet material having adjacent edges turned upward and a securing strip U-shaped in cross section placed over the edges of said flanges and secured thereto by indenting the side walls of said securing piece so as to force the material into apertures in said flanges.

11. An aircraft having its walls made of sheet metal having adjacent edges turned outward to form securing flanges, having end edges turned inward to form other securing flanges, plates placed between the first mentioned flanges and engaging under the last named flanges and a securing strip passing over the first named flanges and securing the same together so as to secure said plates between said flanges.

12. An aircraft having its walls made of sheet metal having adjacent edges turned outward to form securing flanges, having end edges turned inward to form other securing flanges, plates placed between the first mentioned flanges and engaging under the last named flanges.

13. An aeroplane body having half bearings at its rear end and a cap having corresponding half bearings at its inner end fitting over and secured to the said rear end of the body.

In testimony whereof, we sign this specification.

CECIL HAMELIN TAYLOR.
BOUDEWIJN B. NEUTEBOOM.